R. L. COLTER AND E. F. RIOUX.
PHOTOGRAPHIC CAMERA.
APPLICATION FILED FEB. 7, 1919.
1,362,397.
Patented Dec. 14, 1920.
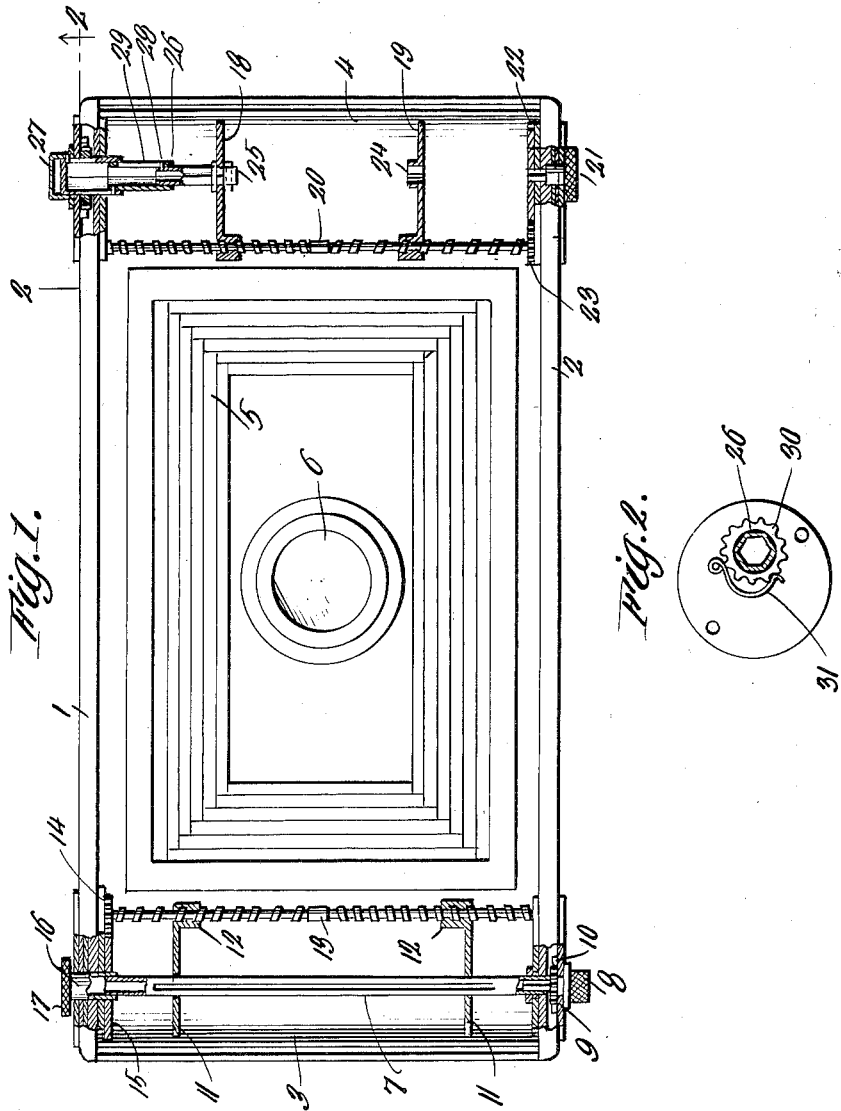
WITNESSES
Guy M. Spring
V. B. Hillyard.
Inventor
ROBERT L. COLTER
EUGENE F. RIOUX
By Richard B. Owen
Attorney

UNITED STATES PATENT OFFICE.

ROBERT LEE COLTER, OF WAUCHULA, FLORIDA, AND EUGENE F. RIOUX, OF WAHNAPITAE, ONTARIO, CANADA, ASSIGNORS OF ONE-TENTH TO RICHARD B. OWEN, OF WASHINGTON, DISTRICT OF COLUMBIA.

PHOTOGRAPHIC CAMERA.

1,362,397. Specification of Letters Patent. Patented Dec. 14, 1920.

Application filed February 7, 1919. Serial No. 275,598.

*To all whom it may concern:*

Be it known that we, ROBERT L. COLTER, and EUGENE F. RIOUX, a citizen of the United States and subject of the King of Great Britain, respectively, residing at Wauchula, in the county of De Sota and State of Florida, and Wahnapitae, Province of Ontario, and Dominion of Canada, respectively, have invented certain new and useful Improvements in Photographic Cameras, of which the following is a specification.

The invention relates to cameras for taking pictures and aims to provide novel film roll holding mechanism which is readily adjustable to the size of the roll and which at the same time centralizes the film so that the picture may occupy the medial portion of the film, thereby enabling a picture of maximum size being taken by a film of a given width.

The invention furthermore provides film roll holding and adjusting mechanism of novel formation which admits of films of different sizes being wound centrally upon the shaft to roller after each exposure in such a manner as to maintain a central position thereon, said mechanism admitting of the film being unwound and rewound upon the film spool for developing and subsequent treatment and printing.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

Referring to the drawings hereto attached,

Figure 1 is a front view of a folding roll camera embodying the invention, parts being broken away and the film roll holding mechanism being in section; and Fig. 2 is a sectional detail on the line 2—2 of Fig. 1.

Corresponding and like parts are referred to in the following description and indicated in both views of the drawings by like reference characters.

The camera illustrated is of the type adapted to fold and designed for film rolls. The frame of the camera comprises an upper member 1 and a lower member 2 which are connected at their ends in any usual way. The end spaces constitute compartments 3 and 4 which are adapted to receive the film rolls. The intermediate space receives the photographic mechanism including the bellows 5, the lens 6 and the means for varying the exposure area.

The compartment 3 receives a shaft 7 which is longitudinally slotted to receive the end of the film. The shaft 7 is journaled in the members 1 and 2 and is provided at one end with a button or finger piece 8 by means of which it may be rotated to wind the film thereon after each exposure. A spur wheel 9 is connected with the shaft 7 and a click 10 coöperates therewith to hold the shaft 7 in the required adjusted position. Plates 11 are mounted upon the shaft 7 to move thereon and each of the plates 11 is provided with a nut 12 which receives the threaded portion of a shaft 13, said shaft having an end portion formed with a right hand thread and the remaining end portion formed with a left hand thread, both threads being of like pitch so as to effect a uniform movement of the plates 11. One of the nuts 12 has a right hand thread and the remaining nut a left hand thread to match the respective threaded portions of the shaft 13. Rotation of the shaft 13 in one direction advances the plates 11 and rotation of the shaft in an opposite direction effects separation of the plates 11. The parts are so disposed that the space formed between the plates 11 occupies a central position between the upper and lower members of the frame, thereby centralizing the film and maintaining it in the center of the exposure field. A pinion 14 is secured to one end of the shaft 13 and is in mesh with a gear wheel 15 secured to the inner end of a boss 16 or like part which is mounted directly in the frame of the camera and is provided at its outer end with a button or like part 17. The boss 16 or like part receives the end of the shaft 7 and is adapted to rotate independently thereof, whereby the shaft 7 may rotate to wind the film thereon or admit of the film unwinding therefrom without effecting rotation of the part 16 and whereby said part 16 may be rotated to effect a setting of the plates 11 according to the size of the film to be wound upon the shaft 7.

The spool holding an adjusting mechanism comprises two plates 18 and 19 which have screw-thread connection with a shaft 20 which is similar in construction to the shaft 13 and mounted in a like manner. A button or finger piece 21 is mounted in the frame and a gear wheel 22 is secured to the inner end of its stem, said gear wheel being in mesh with a pinion 23 secured to an end of the shaft 20. In this manner the right and left threaded shaft 20 may be rotated by means of the button or finger piece 21 to effect adjustment of the plates 18 and 19 to advance or separate said plates according to the size of the roll to be supported thereby. The plate 19 is formed centrally with an opening 24 to receive the journal at one end of the film roll. The plate 18 is provided centrally with a journal 25 to engage the end of the film roll having the usual winding slot. An extensible shaft 26 is connected at its inner end to the plate 18 and is mounted at its outer end in the frame of the camera, the projecting end of the shaft being provided with a button or finger piece 27 by means of which the shaft may be rotated to rewind the film on the spool when required. The extensible shaft 26 comprises a plurality of sections having a telescopic arrangement and of such cross sectional formation as to cause the several sections to rotate. The sections have a limited relative longitudinal movement which is determined by a pin and slot connection. One of the sections is provided with a laterally projecting pin 28 which operates in a longitudinal slot 29 of the section in which it slides. The sections comprising the shaft 26 are of non-circular form held in cross section, as indicated most clearly in Fig. 2, thereby insuring rotation of the several sections when turning the button or finger piece 27 to effect a winding of the film on the spool. The extensible shaft 26 is adapted to be against rotation by means of a spur wheel 30 and a click 31 coöperating therewith, the spur wheel 30 being secured to the outermost section of the shaft.

It will be understood from the foregoing that the invention results in the provision of a camera which may be readily and quickly adapted to receive film rolls of different sizes. By operating the button or finger piece 21 the spool supporting plates 18 and 19 may be adjusted to vary the distance between them according to the size of the spool. The button or finger piece 7 is turned to effect adjustment of the plates 11 according to the size or width of the film so that the latter may wind upon the shaft or roll 7 and be held snugly between the plates 11.

After the camera has been set to adapt it to the size of the film roll the picture is taken in the usual way and after each exposure the film is wound upon the shaft or roll 7. After the film has been wholly exposed it is rewound upon the spool in the usual manner by rotating the button or finger piece 27.

The foregoing description and the drawings have reference to what may be considered the preferred, or approved, form of our invention. It is to be understood that we may make such changes in construction and arrangement and combination of parts, materials, dimensions, et cetera, as may prove expedient and fall within the scope of the appended claims.

Having thus fully described our invention, what we claim as new and desire to secure by Letters Patent is:—

1. In a camera, film supporting elements, a shaft having right and left hand screw-threads in engagement with the respective film supporting elements, a winding shaft in line with the axis of the film supporting elements, means for positively rotating the winding shaft and means for operating the right and left hand threaded shaft and disposed in line with the axis of the winding shaft.

2. In a camera, film supporting elements, means for adjusting the elements according to the size of the film to be received between them and an extensible shaft movable with one of the said elements, and comprising telescoping sections, the inner section being connected to the element and the outermost section being mounted to receive a rotary movement but prevented from longitudinal movement.

3. In a camera, film supporting elements, means for adjusting the elements according to the size of the film to be received between them and an extensible shaft movable with one of the said elements, and comprising telescoping sections, the inner section being connected to the element and the outermost section being mounted to receive a rotary movement but prevented from longitudinal movement and means applied to said outer section to hold the shaft from casual rotation.

4. In a camera, film supporting elements, means for relatively adjusting said elements, an extensible shaft comprising telescoping sections of non-circular form in cross section, the inner section having connection with one of said elements and the outer section being mounted to rotate and held from longitudinal movement, means for limiting the relative outward adjustment of the sections and means for preventing casual rotation of the shaft.

5. In a camera, a shaft adapted to have a film wound thereon, film supporting elements loosely mounted upon the shaft, a right and left hand threaded shaft having screw-thread connection with said elements, means for rotating the first mentioned shaft, an operating member in line with the axis of the shaft and connecting means between said operating member and the right and left hand threaded shaft.

In testimony whereof we affix our signatures in presence of two witnesses.

ROBERT LEE COLTER.
EUGENE F. RIOUX.

Witnesses:
W. YEAMAN,
GRACE PETRINO.